(12) United States Patent
Cao et al.

(10) Patent No.: US 7,974,394 B1
(45) Date of Patent: Jul. 5, 2011

(54) SYSTEM AND METHOD FOR DISTRIBUTED IP TELEPHONY TRACKING

(75) Inventors: Feng Cao, Sunnyvale, CA (US); Binh D. Ha, Fremont, CA (US); Radhika Padmanabhan, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1660 days.

(21) Appl. No.: 10/766,245

(22) Filed: Jan. 26, 2004

(51) Int. Cl.
*H04M 15/00* (2006.01)

(52) U.S. Cl. ................................. 379/133; 379/207.13

(58) Field of Classification Search ............ 379/207.02–207.15, 133
See application file for complete search history.

(56) References Cited

U.S. PATENT DOCUMENTS

| | | | |
|---|---|---|---|
| 6,295,353 B1 | 9/2001 | Flockhart et al. | 379/265 |
| 6,359,976 B1 | 3/2002 | Kalyanpur et al. | 379/134 |
| 6,373,932 B2 | 4/2002 | Bakshi et al. | 379/126 |
| 6,456,845 B1 | 9/2002 | Drum et al. | 455/424 |
| 6,654,602 B1 | 11/2003 | Fye et al. | 455/414 |
| 6,674,734 B1 * | 1/2004 | Hsu et al. | 370/331 |
| 6,885,861 B2 * | 4/2005 | Koskelainen | 455/414.2 |
| 6,922,786 B1 * | 7/2005 | Ong | 713/154 |
| 7,103,045 B2 * | 9/2006 | Lavigne et al. | 370/392 |
| 7,280,540 B2 * | 10/2007 | Halme et al. | 370/392 |
| 2001/0032271 A1 * | 10/2001 | Allen | 709/239 |

OTHER PUBLICATIONS

Cao, Ha, Padmanabhan, Yuan, and Tran, Call Filltering and Traking in Ip Telephony, Aug. 13-14, 2003, Prcoedings of the 7th IASTED International Conference, Internet and Multimedia Systems and Applications, pp. 133-139.*
Call Filtering and Tracking in IP Telephony, Aug. 13-15, 2003, Proceedings of the 7th IASTED International Conference, Honolulu, Hawaii, USA.*
J. Rosenberg, Telephony Routing Over IP (TRIP), Nov. 2000.*

* cited by examiner

*Primary Examiner* — Curtis Kuntz
*Assistant Examiner* — Amal Zenati
(74) *Attorney, Agent, or Firm* — Baker Botts L.L.P.

(57) ABSTRACT

A method of filtering telecommunication service includes receiving a call that includes a call identifier. The method also includes determining a filter status of the call and transmitting a notification message to a remote node. The notification message identifies the call identifier and the filter status of the call.

37 Claims, 7 Drawing Sheets

SYSTEM AND METHOD FOR DISTRIBUTED IP TELEPHONY TRACKING

TECHNICAL FIELD OF THE INVENTION

This invention relates in general to telecommunications, and more particularly to a system and method for distributed telephony tracking and/or filtering.

BACKGROUND OF THE INVENTION

Filtering calls based on characteristics such as the phone numbers of the devices involved in the call, network addresses of the devices involved in the call, or the carrier responsible for the call, allows a communication system to effectively perform tasks related to security, quality of service (QoS), network management, troubleshooting and other aspects of communication services. By tracking a call as the call advances through a network and assigning filtering responsibilities to components distributed throughout the network, a communication system can distribute workload more efficiently and provide more effective communication service.

Tracking may be accomplished by embedding information in existing communication protocols operating on the communication system. There are, however, a number of drawbacks to embedding the information in existing protocols. For example, a particular communication system may support multiple protocols. Embedding the information may therefore require modifying multiple protocols, adding significant complexity to tracking features. Additionally, embedded information must be interpreted and relayed between protocols when a call bridges interconnected domains operating under different protocols. Furthermore, if there is no signaling message in the middle of established calls, an artificial signaling message must be generated when tracking information originates in the middle of the communication system.

SUMMARY OF THE INVENTION

In accordance with the present invention, the disadvantages and problems associated with telephony filtering have been substantially reduced or eliminated. In particular, a method and system are provided for communicating a filter status of a call to a plurality of nodes.

In accordance with one embodiment of the present invention, a method of filtering telecommunication service includes receiving a call that includes a call identifier. The method also includes determining a filter status of the call and transmitting a notification message to a remote node. The notification message identifies the call identifier and the filter status of the call.

In accordance with another embodiment of the present invention, a system for tracking telecommunication services includes a filter node and a plurality of network nodes. The filter node is capable of receiving a call that includes a call identifier. The filter node is also capable of determining a filter status of the call and transmitting a notification message to a network node. The notification message identifies the call identifier and the filter status of the call. Additionally, the network nodes are capable of receiving the call and taking a filter action based on the filter status of the call.

Important technical advantages of certain embodiments of the present invention include the provision of distributed filtering services. Other important technical advantages of certain embodiments of the present invention include modular implementation and modification of filtering services and the communication filter status information outside of existing communication protocols.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
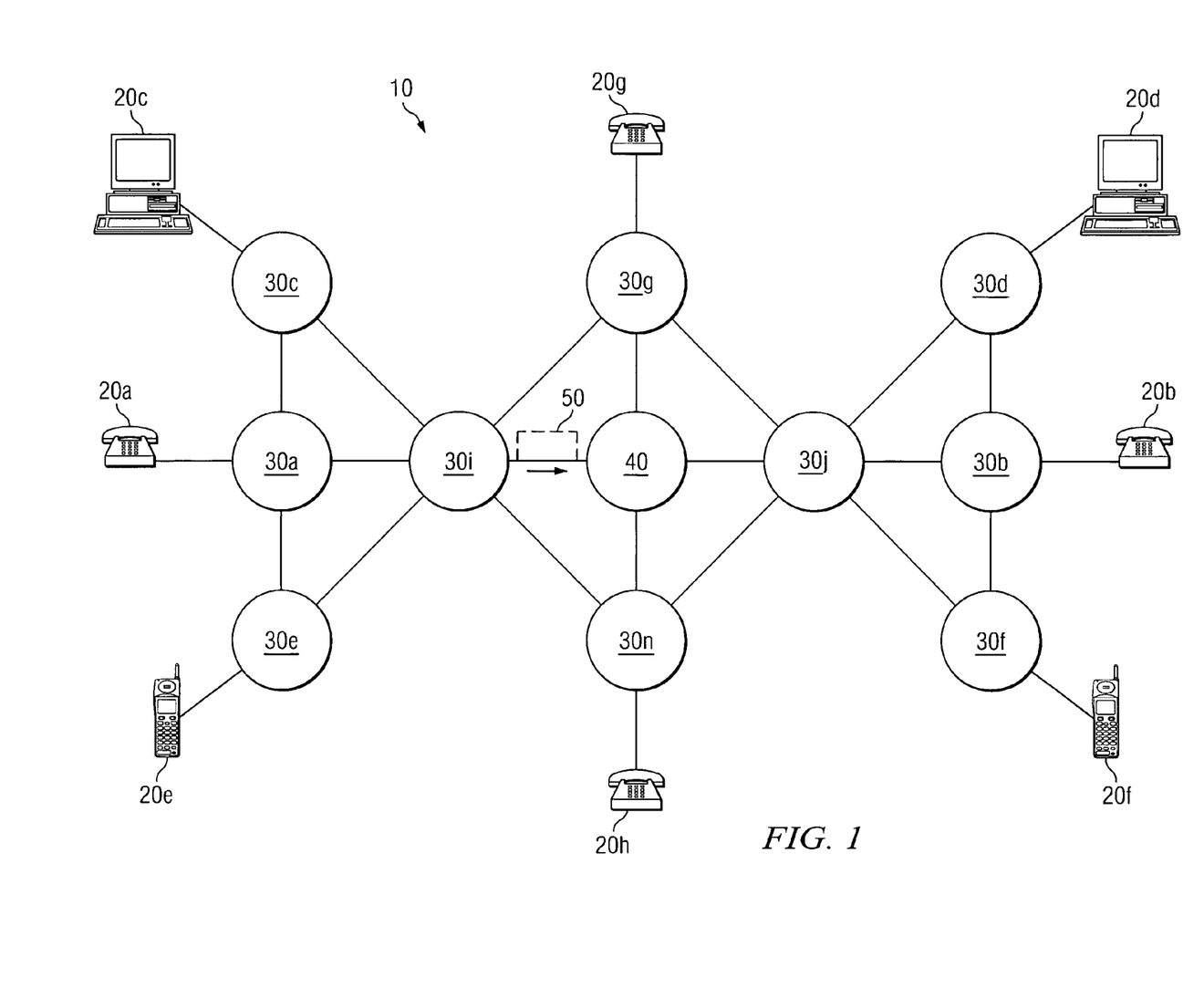
FIG. 1 illustrates a communication system according to a particular embodiment of the present invention.

FIG. 1 illustrates a communication system 10, according to a particular embodiment. Communication system 10 includes endpoints 20, nodes 30, and filter nodes 40. Nodes 30 and filter node 40 support communication between endpoints 20 by transmitting a call along a path between endpoints 20. Additionally, filter node 40 determines a filter status of a call received on communication network 30 and, after establishing capabilities of nodes 30, communicates the filter status to one or more nodes 30 based on the capabilities of nodes 30. Nodes 30 may then initiate filter actions with respect to the call, based on the filter status. Furthermore, the filter status may be propagated along the path, both upwardly and downwardly, providing end-to-end tracking and filtering services.

By distributing filter functionality and tracking a call as the call progresses through communication system 10, communication system 10 is able to provide differentiated service, better network management, flexible call monitoring, and convenient trouble shooting features. In a particular embodiment, communication system 10 may be capable of tracking calls along a path from one endpoint 20 to another and provide filter status information, such as whether a the call matches certain criteria, to all nodes 30 along the path, so that calls with a particular filter status may be tracked and appropriate filter actions initiated in response to the calls.

Endpoints 20 provide communication service to users of endpoints 20. Endpoints 20 may be any combination of hardware, software, and/or encoded logic that provides communication services to a user. For example, endpoints 20 may include a telephone, a computer running telephony software, a video monitor, a camera, or any other communication hardware, software, and/or encoded logic that supports the communication of packets of media (or frames) using communication system 10. In a particular embodiment, endpoints 20 represent IP telephones. Endpoints 20 may also include unattended or automated systems, gateways, other intermediate components, or other devices that can establish media sessions. Although FIG. 1 illustrates a particular number and configuration of endpoints 20, communication system 10 contemplates any number or arrangement of such components for communicating media.

Additionally, the description below illustrates operation of communication system 10 based on the presumption that endpoint 20a initiates communication with endpoint 20b. Thus, for the purposes of simplicity these endpoints 20 are referred to as source endpoint 20a and destination endpoint 20b, respectively. The labels "source" and "destination" are not intended to limit in any way the definition of endpoints 20 provided above. In operation, these roles may be reversed, or any other endpoint 20 may serve as a source or destination for communication initiated on communication system 10.

Nodes 30 couple to other nodes 30 and to filter node and are capable of creating transmission paths to route calls between endpoints 20. Additionally, nodes 30 may be capable of receiving a filter status from filter nodes 40 and using the filter status to initiate filter actions. Nodes 30 may include any combination of network components, gatekeepers, call managers, routers, bridges, hubs, switches, gateways, endpoints, telephony interfaces, IP interfaces, digital signal processors, protocols, voice routing modules, or call control modules, or other hardware, software, or embedded logic implementing any number of communication protocols that allow for the exchange of data in communication system 10. In a particular embodiment, nodes 30 represent Voice over IP ("VoIP") components. For example, in such an embodiment nodes 30 may represent any of a voice proxy, such as a Session Initiation Protocol ("SIP") proxy or an H.323 proxy; a call manager; a signaling voice gateway, such as an IP-IP gateway; and/or a telephony terminal, such as an IP telephone.

Filter node 40 couples to nodes 30 and cooperates with nodes 30 to create transmission paths for routing calls from one endpoint 20 to another. Additionally, filter node 40 determines a filter status of the call, as described below, and communicates the filter status to nodes 30. Filter node 40 may include any combination of network components, gatekeepers, call managers, routers, bridges, hubs, switches, gateways, endpoints, telephony interfaces, IP interfaces, digital signal processors, protocols, voice routing modules, or call control modules, or other hardware, software, or embedded logic implementing any number of communication protocols that allow for the exchange of data in communication system 10. In a particular embodiment, filter node 40 represents Voice over IP ("VoIP") components. For example, in such an embodiment filter node 40 may represent a voice proxy, such as a Session Initiation Protocol ("SIP") proxy or an H.323 proxy; a call manager; a signaling voice gateway, such as an IP-IP gateway; and/or a telephony terminal, such as an IP telephone. Filter node 40 may also include, or couple to, a user interface 43 that allows filter node 40 to interact with a user of communication system 10, for example, to enter a filter criteria list 45, as discussed above.

Nodes 30 and filter node 40 may represent identical components configured to operate in a different manner for different calls. For example, a particular component may be configured to filter calls of a designated type. For a call of the designated type, the component may represent a filter node 40 as described herein. For calls of other types, the component may represent a node 30. Additionally, FIG. 1 shows a communication system that includes a plurality of nodes 30 and, for the sake of simplicity, a single filter node. Nonetheless, communication system 10 may include any appropriate number of filter nodes 40 and nodes 30. Moreover, all nodes 30 in communication system 10 may represent filter nodes 40 capable of determining and communicating the filter status of calls.

A particular node 30 may be dynamically designated filter node 40 based on Simple Network Management Protocol (SNMP) principles, input from a user, operation of network management tools and/or any other suitable provisioning techniques. The designation may similarly be altered or removed using any suitable provisioning techniques and filter node 40 may revert to operating as a node 30.

In operation, filter node 40 determines a filter status of a call passing through filter node 40. The "call" represents a communication session including at least one call packet 50. The call may represent audio and/or video signals, data, or messages transmitted through voice devices, text chat, web sessions, facsimile, instant messaging, e-mail, or any other type of digital communication. In the illustrated embodiment, the call represents a voice call communicated using Voice over IP (VoIP) protocol.

When call packet 50 associated with the call passes through filter node 40, filter node 40 determines a filter status of the call. The filter status represents a characteristic of call packet 50, or a determination made based on a characteristic of call packet 50.

Examples of the filter status or of the characteristics from which the filter status can be derived include, but are not limited to, a phone number or network address of source endpoint 20a, a phone number or network address of destination endpoint 20b, a phone number of a secondary destination endpoint 20, the carrier responsible for the call, a call interface designated by the call, a voice protocol or protocol type used by the call, a pin number associated with the call, a remote signaling or media network address for the call, a dial peer associated with the call, a source carrier for the call, whether the call is incoming or outgoing, and/or any other suitable characteristic, or a conclusion, analysis, or description based on one or more such characteristic of call packet 50. For example, filter node 40 may determine a filter status that represents the phone number of source endpoint 20a, or conversely, a filter status that identifies call packet 50 as "external" based on the phone number of source endpoint 20a.

In a particular embodiment, filter node 40 may determine the filter status of the call based on a filter criteria list 45 stored in filter node 40. Filter criteria list 45 may identify one or more characteristics on which filter node 40 determines the filter status and a logical relationship, such as an "AND"/"OR" relationship, on which filter node 40 determines the filter status. For example, filter criteria list 45 may define a filter status of, or based on, whether the call has a particular incoming calling number, a particular incoming called number, a particular outgoing called number and a particular outgoing called number, or whether the call is associated with a particular pin number. If filter node 40, includes a user interface 43, user interface 43 may allow a user to enter filter criteria list 45 for filter node 40.

Additionally, nodes 30 register an ability to receive filter statuses from filter node 40. After determining the filter status of the call, filter node 40 notifies particular nodes of the filter status of the call, based on the capabilities of these particular nodes 30. The registration and notification processes are illustrated in greater detail below in FIGS. 2 and 3, respectively.

After receiving the filter status from filter node 40, nodes 30 decide, based on the filter status of the call, whether to initiate a filter action when nodes 30 receive call packets 50 of the call. Filter actions represent actions taken or triggered by components of communication system 10 with respect to a particular call in response to, as a result of, or based on the filter status of that call. In general, node 30 may be configured to initiate any appropriate filter actions for call packet 50 based on the call filter status. Examples of filter actions include, but are not limited to, selecting a different path to destination endpoint 20b for call packet 50, choosing a new destination for call packet 50, recording receipt of call packet 50, dropping call packets 50 associated with unauthorized calls, and any other suitable actions to be taken on call packets 50 based on the filter status of call packets 50. For example, receipt of a call from a phone number associated with an external source endpoint 20 may trigger re-routing of the call through a node 30 responsible for security services on communication system 10.

Because filter node 40 is able to transmit the filter status of a call to nodes 30, the determination of the filter status and the execution of filter actions may take place at different points located anywhere in communication system 10. This allows for modular implementation and modification of the filtering features that communication system 10 provides. The distributed nature of the filtering process also allows for particular filter nodes to specialize in filtering services pertaining to a particular type of call. Furthermore, communication system 10 provides a scalable solution for call tracking and filtering that can offer multiple services to a particular call consistently across a broadly dispersed communication system 10.

Additionally, because communication system 10 is able to communicate the filter status without embedding the filter status in protocols that are used to set-up a call and communicate media between two or more parties operating on communication system 10, the implementation of filter node 40 does not require modification to the media and signaling protocols supported by communication system 10. Moreover, tracking of filter status information does not require the translation of embedded information between protocols during operation. Furthermore, because filter node 40 does not rely on media or signaling protocols operating on communication system 10 to transmit the filter status to nodes 30, filter node 40 can communicate the filter status, upstream and downstream along the path of the call, without generating dummy media or signaling messages that may have undesired side effects.

Particular embodiments of communication system 10 may also provide special benefits for services of certain types. For example, communication system 10 may provide enhanced access control and security features that limits unauthorized access to components of communication system 10. The tracking and filtering features of communication system 10 may also allow for media forking to deliver calls to monitoring sites.

As another example, particular embodiments may allow communication system 10 to provide differentiated QoS service to calls, such as to prioritize calls or provide specialized treatment, based on the filter status of the calls. As yet additional examples, particular embodiments of communication system 10 may provide tracking features that enable user to collect information for improved network management and troubleshooting.

Figure 2:
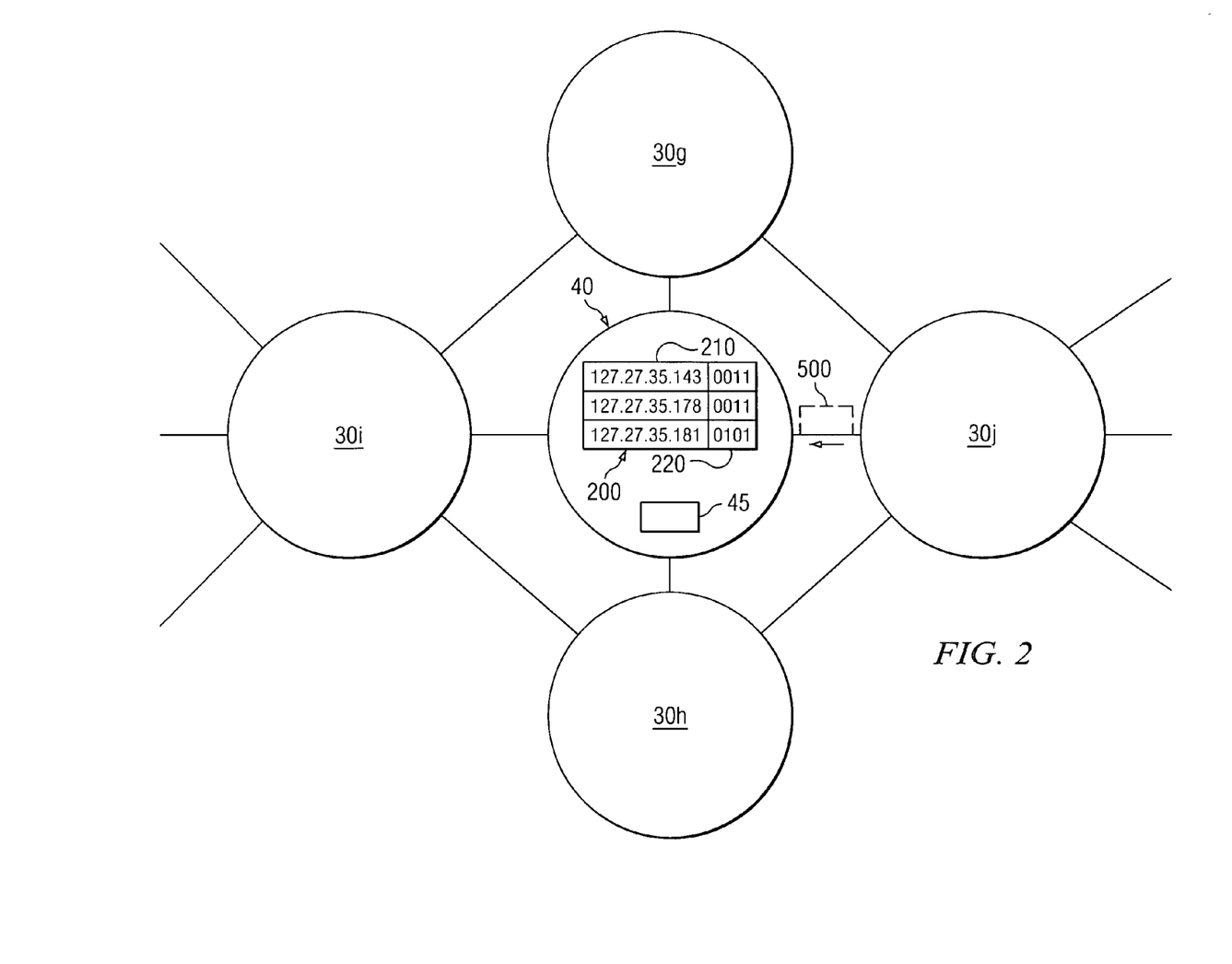
FIG. 2 illustrates operation of portions of the communication system, including a filter node and a plurality of nodes, during registration of the nodes with the filter node.

FIG. 2 provides an expanded view of nodes 30g-j and filter node 40 to illustrate the manner in which node registers with filter node 40, according to a particular embodiment of communication system 10. Nodes 30 register with filter node 40 an ability to receive the filter status of a call transmitted on communication system 10. As described below with respect to FIG. 3, filter node 40 subsequently communicates the filter status to nodes 30 based on the registered abilities of nodes 30.

Figure 5A:
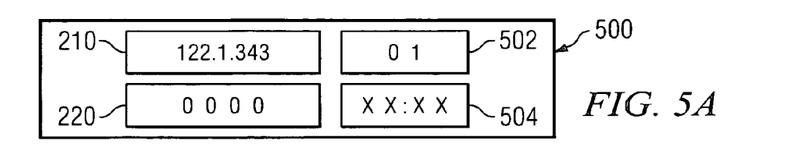
FIG. 5A illustrates contents of an open message according to a particular embodiment.

More specifically, a particular node 30, for the purposes of this example node 30j, indicates to filter node 40 an ability to receive filter statuses for calls on communication system 10. Node 30j indicates the ability by sending an open message 500 to filter node 40. Open message 500 may include configuration information that defines types of filter statuses or types of messages that node 30j is able to or interested in receiving. FIG. 5A illustrates in greater detail the contents of open message 500, according to a particular embodiment.

Node 30j may send open message 500 immediately after power-up of node 30j, after receiving an inquiry from a neighboring node 30, or at any other suitable time. Moreover, in an embodiment of communication system 10 that includes multiple filter nodes 40, node 30j may determine the identity and location of the appropriate filter node 40 to contact based on a prior open message 500 received from filter node 40, based on communication with another component, such as a Dynamic Host Configuration Protocol ("DHCP") server, of communication system 10, or in any other suitable manner.

In response to receiving open message 500, filter node 40 updates a node list 200 maintained by filter node 40 to reflect open message 500. Node list 200 includes one or more node identifiers 210 that uniquely identify nodes 30 in communication system 10 that are able to receive filter statuses from filter node 40. Node identifiers 210 may represent Internet Protocol ("IP") addresses, Media Access Control ("MAC") addresses, or any other information appropriate for identifying nodes 30.

Additionally, node list 200 may include configuration information 220 associated with each node identifier 210. As noted above, configuration information 220 identifies types of filter statuses or message types that the node 30 associated with node identifier 210 is capable of or interested in receiving from filter node 40.

Figure 5B:
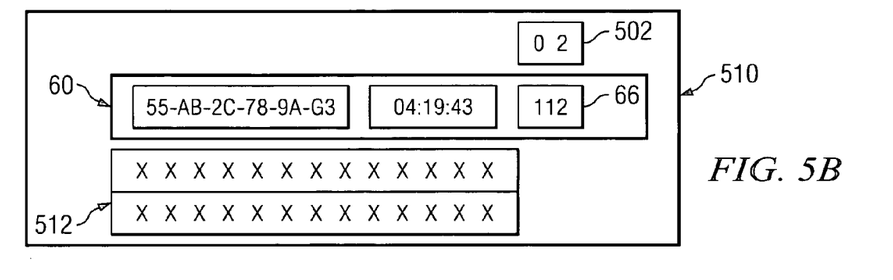
FIG. 5B illustrates contents of a notification message according to a particular embodiment.
Figure 5C:
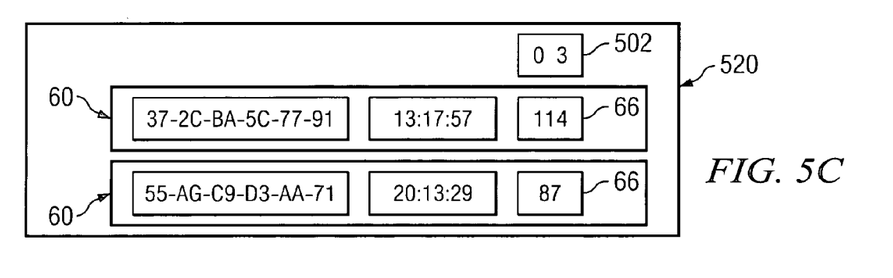
FIG. 5C illustrates contents of a request message according to a particular embodiment.
Figure 5D:
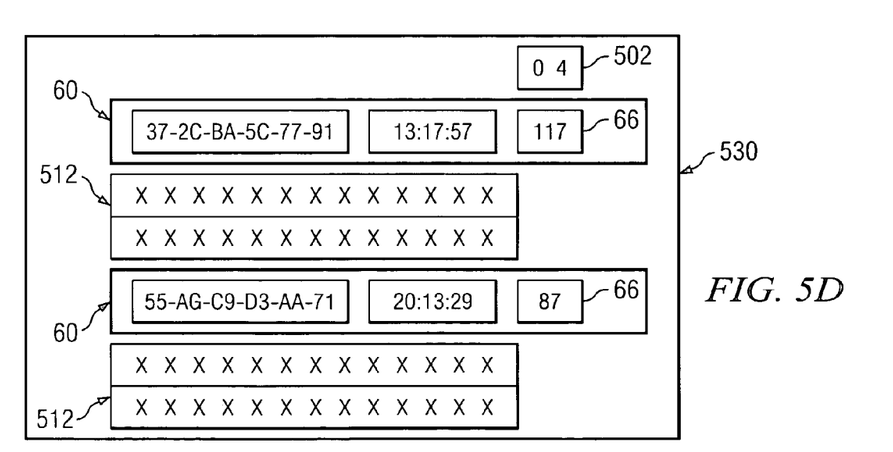
FIG. 5D illustrates contents of an acknowledgement message according to a particular embodiment.
Figure 5E:
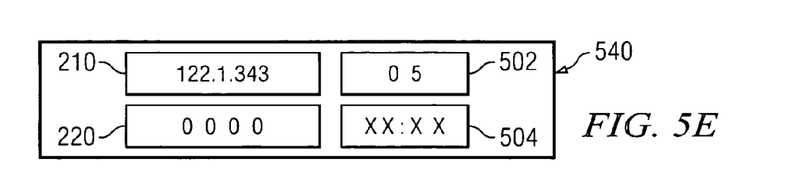
FIG. 5E illustrates contents of a keepalive message according to a particular embodiment.

Filter node 40 may eliminate node 30j from node list 200, if node 30j does not periodically renew registration with filter node 40. Node 30j renews registration by communicating a keepalive message 540 to filter node 40. FIG. 5E illustrates in greater detail the contents of keepalive message 540 according to a particular embodiment. If filter node 40 does not receive a keepalive message from node 30j within a predetermined time period, filter node 40 may delete the node identifier 210 of node 30j from node list 200.

Thus, filter node 40 is able to maintain an updated node list 200 that identifies nodes 30 capable of receiving filter statuses from filter node 40. Filter node 40 may use node list 200 to determine suitable nodes 30 to send filter statuses for calls subsequently placed on communication system 10.

Figure 3:
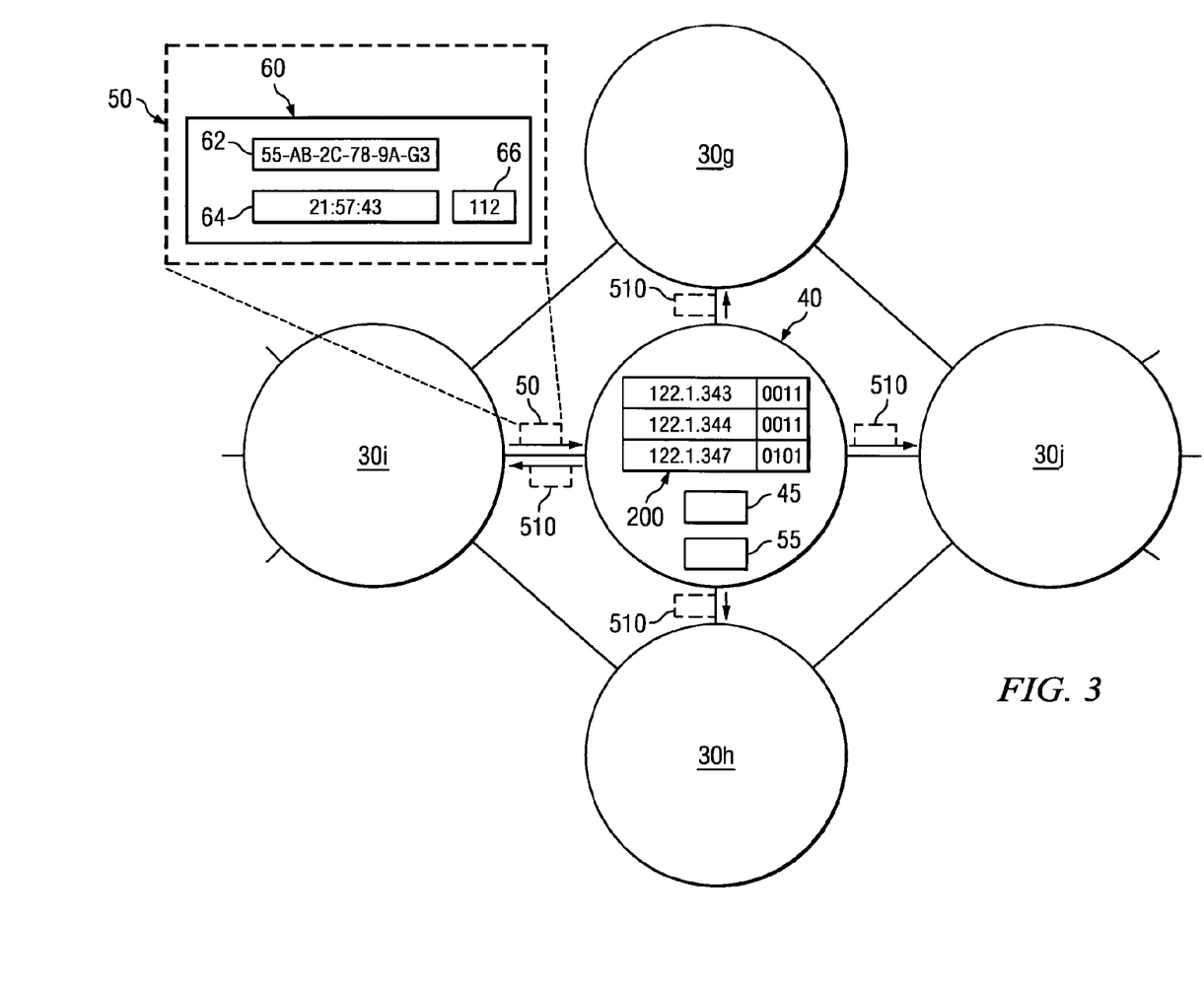
FIG. 3 illustrates operation of portions of the communication system while filter node determines a filter status of a call on the communication system.

FIG. 3 illustrates example operation of filter node 40 in communicating the filter status of a call to nodes 30. After one or more nodes 30 register with filter node 40, filter node 40 can begin communicating filter statuses to the registered nodes 30 for calls placed on communication system 10.

For example, in operation, a user of source endpoint 20 places a call to destination endpoint 20b. Following any appropriate signaling to establish a media path between source endpoint 20a and destination endpoint 20b, source endpoint 20a begins communicating call packets 50 to destination endpoint 20b along the media path through one or more nodes 30 and filter nodes 40.

Call packet 50 includes a call identifier 60 that allows components of communication system 10 to identify call packets 50 associated with a particular call from call packets 50 associated with one or more other calls simultaneously being transmitted on communication system 10. Call identifier 60 may be assigned to a call by source terminal 20a, the first node 30 in along the path to destination terminal 20b, or any other appropriate component of communication system 10. In a particular embodiment, all components of communication system 10 are capable of recognizing call identifier 60 and identifying the call associated with call packet 50 based on call identifier 60. In alternative embodiments, only filter node 40 and components responsible for initiating filter actions are capable of recognizing call identifier 60.

Call identifier 60 may represent any appropriate information that uniquely identifies call packet 50 and/or the call associated with call packet 50, such as the Global Unique Identifier ("GUID") supported by products of Cisco, Incorporated. As shown in the blowup circle of the illustrated embodiment, call identifier 60 represents a sixteen-byte value that includes a MAC address 62 of source endpoint 20a, a timestamp 64 indicating a time the call was initiated, and a sequence number 66 associated with the call.

When call packet 50 passes through filter node 40, filter node 40 determines the filter status of the call associated with call packet 50, as described above with respect to FIG. 1. After determining the filter status, filter node 40 communicates the filter status to nodes 30 by transmitting a notification message 510. FIG. 5B describes in more detail the contents of a notification message according to a particular embodiment.

Filter node 40 may transmit notification message 510 to particular nodes 30 based on node list 200. For example, in a particular embodiment, node list 200 only includes node identifiers 210 for nodes 30 capable of receiving notification messages 510. In this case, filter node 40 may transmit notification message 510 to all nodes 30 associated with node identifiers 210 listed in node list 200. In the illustrated example, filter node 40 communicates notification message 510 to all nodes in node list 200, specifically, nodes 30g-30j.

Alternatively, node list 200 may include configuration information 220 and filter node 40 may transmit notification message 510 selectively based on configuration information 220. For example, configuration information 220 may identify whether a particular node 30 is interested in or capable of receiving notification messages 510 for calls with a particular filter status, such as external calls.

Filter node 40 and nodes 30 may also store dynamic node information 55 which is transmitted to components of communication system 10 in other protocols, for example, during signaling. Dynamic node information 55 may identify a next-hop node 30 for a particular call, a sending node 30 of the call, a node 30 serving as a gatekeeper for the call, or any other information describing the relationship between components of communication system 10 and the call. Filter node 55 may additionally determine which nodes 30 to send notification message 510 for this particular call based in part on dynamic node information 55. For example, filter node 55 may determine that only nodes along the media path of the call need to receive notification message 510 for the call.

Each of nodes 30g-30j maintains a call list 70 that identifies the filter status of calls associated with particular call identifiers 60. Nodes 30g-30j update their respective call lists 70 based on notification message 510 received from filter node 40. Filter node 40 may also maintain a call list 70 that filter node updates after determining the filter status of calls.

Contents of call list 70 may vary depending on the configuration of communication system 10 and the particular node 30. In the illustrated embodiment, node maintains call list 70 that includes only call identifiers 60 of calls that have a particular filter status, such as "external." As another example, node 30 may maintain call list 70 that includes the call identifier 60 for every call received by filter node 40 and additional information describing the specific filter status associated with each call identifier 60.

Nodes 30 may also decide to forward notification message 510 to neighboring nodes 30. Nodes 30 may maintain local copies of dynamic node information 55 described above. A particular node 30 may decide to forward to a neighboring node based on dynamic node information 55 or any other appropriate considerations. For example, dynamic node information 55 stored by a particular node may identify the next-hop node for the call associated with notification message 510. Node 30 may decide to forward notification message 510 to the next-hop node 30. Thus, communication system 10 may achieve end-to-end propagation of the filter status for a particular call in this additional way.

Figure 4:
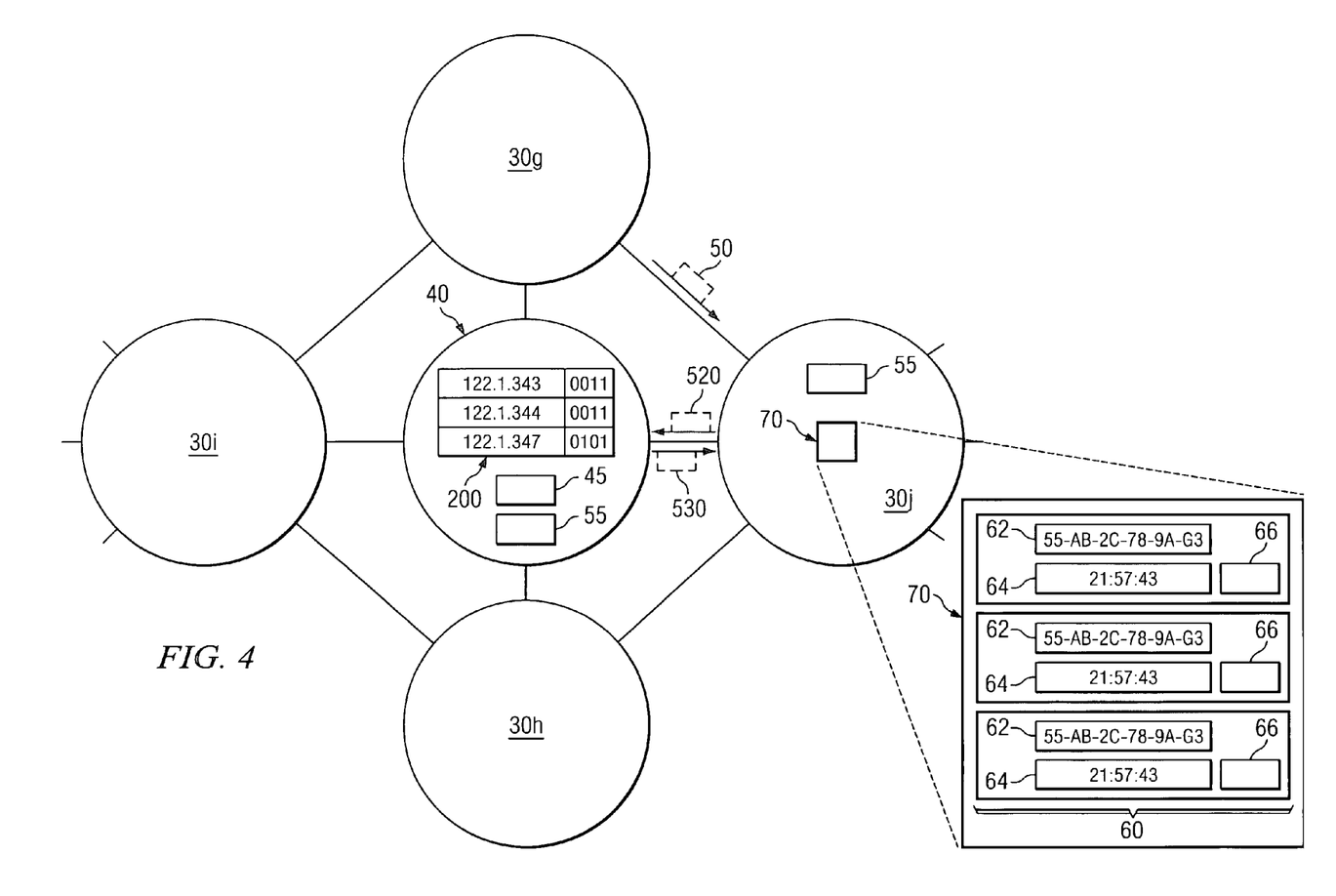
FIG. 4 illustrates operation of portions of the communication system while the nodes initiate filter actions.

FIG. 4 illustrates example operation of nodes 30 in initiating filter actions based on a filter status received from filter node 40. After registering with filter node 40 and receiving notification message 510 from filter node 40, a particular node, in this case node 30j, may initiate a filter action in response to call packet 50 received from filter node 40 or another node 30.

More specifically, upon receiving call packet 50 node 30j determines based on the filter status of the call associated with call packet 50 whether to initiate a filter action with respect to the call. More specifically, node 30j extracts call identifier 60 from call packet 50 and determines the call status associated with call identifier 60 using call list 70. In the illustrated example, node 30j determines whether to initiate the filter action based on whether call identifier 60 is included in call list 70, which indicates that the call associated with call identifier 60 has a particular filter status, such as "external call." In an alternative embodiment, node 30j may receive and store in call list 70 filter statuses for all calls filtered by filter node 40, instead of only those with a particular filter status as illustrated. In this alternative embodiment, call list 70 may store additional filter status' information with call identifier 60, and node 30j may decide whether to initiate the filter action by processing this additional filter status information.

As noted above, filter actions represent actions or responses taken by components of communication system 10 with respect to a particular call in response to, as a result of, or based on the filter status of that call. Examples of filter actions include, but are not limited to, selecting a different path to destination endpoint 20b for call packet 50, choosing a new destination for call packet 50, recording receipt of call packet 50, dropping call packet 50 associated with unauthorized calls, and any other suitable actions to be taken on call packets 50 based on the filter status of call packets 50. For example, receipt of a call from a phone number associated with an external source endpoint 20 may trigger re-routing the call through a node 30 responsible for security services on communication system 10.

Additionally, if node 30j receives call packet 50 containing a particular call identifier 60 not included in call list 70 stored by node 30, node 30j may request the filter status from filter node 40 or another node 30. This may occur, for example, if node 30j comes online after filter node 40 sends notification message 510 identifying the filter status of the relevant call identifier 60. In a particular embodiment, node 30 requests the filter status by transmitting a request message 520 to filter node 40. Request message 520 includes call identifier 60 associated with the call for which node 30 is seeking the filter status. FIG. 5C provides further details on the contents of request message 520.

In response to receiving request message 520, filter node 40 determines, based on call list 70 stored at filter node 40, whether filter node 40 possesses the filter status of the call identified by the requesting node 30. Filter node 40 may then communicate the filter status to the requesting node 30, or, if filter node 40 does not have the filter status requested, may identify to the requesting node 30 another node 30 that may have the requested filter status. In a particular embodiment, filter node 40 communicates the filter status to the requesting node 30 in an acknowledgement message 530. FIG. 5D provides more detail on the contents of acknowledgement message 530.

FIGS. 5A-5D further illustrate the contents of different types of messages used by filter node 40 and nodes 30 to provide the filtering services described in FIGS. 1-4. The messages illustrated in FIGS. 5A-5D may collectively represent elements of a single protocol, such as Cisco, Inc.'s IP Telephony Tracking Protocol ("IPTT"). Alternatively, the messages may represent communication conforming to multiple, disparate protocols implementing the functionality of communication system 10.

Thus, as illustrated in FIGS. 1-4, a particular embodiment of communication system 10 may use multiple types of messages to provide tracking and filtering services, summarized as follows. During registration, node 30 communicates open message 500 to filter node 40 to indicate an ability to receive filter status information. Subsequently, filter node 40 receives call packet 50 associated with a call and determines a filter status of the call. Filter node 40 then communicates the filter status to nodes 30 by transmitting nodes 30 notification message 510. Nodes 30 may determine whether to initiate a filter action, based on the filter status of the call, when nodes 30 receive call packet 50. If node 30 needs filter status information for a call for which node 30 has not received filter status information, node 30 may request filter status information from filter node 40 or another node 30 by transmitting request message 520. Filter node 40 or another node 30 may respond to request message 530 by transmitting node 30 filter status information in acknowledgement message 530. Additionally, node 30 may periodically transmit filter node 40 keepalive message 540 to renew registration with filter node 40. Contents of these various messages according to particular embodiments are described below in FIGS. 5A-5E.

FIG. 5A illustrates the contents of open message 500 according to a particular embodiment. Node 30 communicates open message 500 to filter node 40 to register an ability to receive filter statuses. Open message 500 may include a message type 502 and a hold time 504. Open message 500 may also include node identifier 210 and configuration information 220 as described above.

Message type 502 indicates to filter node 40 that this message is an open message 500. Open message 500 and the additional message types described below are each associated with a value for message type 502 that uniquely identifies the type of the message. In the illustrated embodiment, open message 500 is associated with a message type 502 of "1."

Node identifier 210 identifies node 30 that sent open message 500. Upon receipt of open message 500, filter node 40 may add node identifier 210 to node list 200 maintained by filter node 40. As discussed above, node list 200 stores node identifiers 210 for nodes 30 operating on communication system 10.

Hold time 504 identifies a period of time for which open message 500 is valid. Filter node 40 may remove node identifier 210 from node list 200 if filter node 40 does not subsequently receive keepalive message 540 from node 30 within the period of time identified by hold time 504.

Configuration information 220 further defines the ability of node 30 to send and receive messages related to the filter status of calls. Configuration information 220 may include any information appropriate for defining the abilities of node 30. In a particular embodiment, configuration information 220 represents a four-bit value indicating the ability of node 30 to send request messages 520, receive request messages 520, send notification messages, and receive notification messages 510, respectively. Thus, in addition to being used by nodes 30 to register with filter node 40, open message may be used, in an embodiment of communication system 10 that includes multiple filter nodes 40, by a first filter node 40 to communicate to a second filter node 40 the fact that first filter node 40 is capable of determining filter statuses of calls and sending notification messages 510.

Node 30 may communicate open message 500 to filter node 40 when node 30 comes on-line, when node 30 detects a new filter node 40, or at any other appropriate time. Additionally, node 30 may communicate open message 500 to any appropriate filter nodes 40 depending on the configuration of communication system 10. As one example, node 30 may broadcast open message 500 to all filter nodes 40 on communication system 10. As another example, node 30 may communicate open message 500 to all filter nodes 40 that neighbor node 30. As yet another example, node 30 may retrieve node list 200 of appropriate filter nodes 40 from a directory server and then communicate open message 500 to filter nodes 40 identified on node list 200.

FIG. 5B illustrates the contents of notification message 510 according to a particular embodiment. Filter node 40 communicates notification message 510 to one or more receiving nodes 30 to provide filter statuses to nodes 30. Notification message 510 includes message type 502 and one or more call identifiers 60, as defined above. Notification message 510 also includes filter status information 512 for each call identifier 60.

Filter status information 512 describes results of filtering completed by filter node 40 on call packets 50 of the call associated with call identifier 60. Filter status information 512 may identify the filter status of the call, a call type of the call, filter nodes 40 that have received call packets 50 of the call, and/or any other suitable information about the call. Nodes may then determine appropriate filter actions to be taken based on the filter status and other filter status information 512. For example, filter node 40 may determine that a call originated from an endpoint 20 external to a network on which filter node 40 and nodes are located. In this example, filter status information 512 may indicate that the call originated from an external endpoint 20 and nodes 30 determine, based on their own configuration, appropriate filter actions to initiate on call packets 50 associated with the call.

Additionally, filter status information 512 may identify specific filter actions to be taken by nodes 30. Returning to the example, filter status information 512 may, in this case, specify particular security measures to be taken by nodes 30. Furthermore, filter status information 512 may identify a combination of specific filter actions to be taken by nodes 30 on the call and characteristics of the call to be used by each nodes 30 to determine, based on their own configuration, additional filter actions to be taken. Thus, in the external endpoint example, filter status information 512 may specify basic security actions to be taken by nodes 30 and also identify that the call is from an external endpoint 20 of a certain type. Individual nodes 30 may then use this additional information to determine additional security actions that may be appropriate based on the configuration and characteristics of the individual node 30, such as, whether or not that node 30 has access to sensitive information.

Filter node 40 may generate notification message 510 in response to filtering completed by filter node 40 on call packets 50 associated with the included call identifier 60. Alternatively, filter node 40 may periodically generate and transmit notification message 510 for all calls which filter node 40 has filtered since a previous notification message 510. For example, filter node 40 may, every 30 seconds, transmit a notification message 510 that includes filter status information 512 for all calls which filter node 40 has filtered in the last 30 seconds. In general, filter node 40 may communicate notification message 510 to nodes 30 at any appropriate time to update nodes 30 of the filter status of particular calls.

FIG. 5C illustrates the contents of request message 520 according to a particular embodiment. Node 30 communicates request message 520 to one or more filter nodes 40 to request the filter status of one or more calls. Request message 520 includes call identifiers 60 associated with calls for which node 30 is seeking the filter status and message type 502.

Node 30 may send request message 520 when node 30 comes online, when node 30 needs the filter status of a particular call, or at any other suitable time. Furthermore, if communication system 10 includes multiple filter nodes 40, node 30 may send request message 520 to all filter nodes 40, filter nodes 40 that have indicated particular capabilities in their open message 500, or any other group of one or more filter nodes 40.

FIG. 5D illustrates the contents of acknowledgement message 530 according to a particular embodiment. Filter node 40 communicates acknowledgement message 530 to node 30, in response to request message 520 previously sent by node 30. Acknowledgement message includes one or more requested call identifiers 60 and filter status information 512 for requested call identifiers 60. If filter node 40 does not have the filter status of the calls associated with requested call identifiers 60, filter node 40 may substitute information identifying another filter node 40 or node 30 expected to have the requested filter status information 512.

FIG. 5E illustrates the contents of keepalive message 540 according to a particular embodiment. Node 30 communicates keepalive message 540 to filter node 40 to renew or update the registration of capabilities that node 30 previously made by sending open message 500. Keepalive message 540 includes node identifier 210, hold time 504, and configuration information 220, as defined above. Node 30 may identify filter nodes 40 to send keepalive message 540 and appropriate times for communicating keepalive messages 540 as described above for open message 500.

Figure 6:
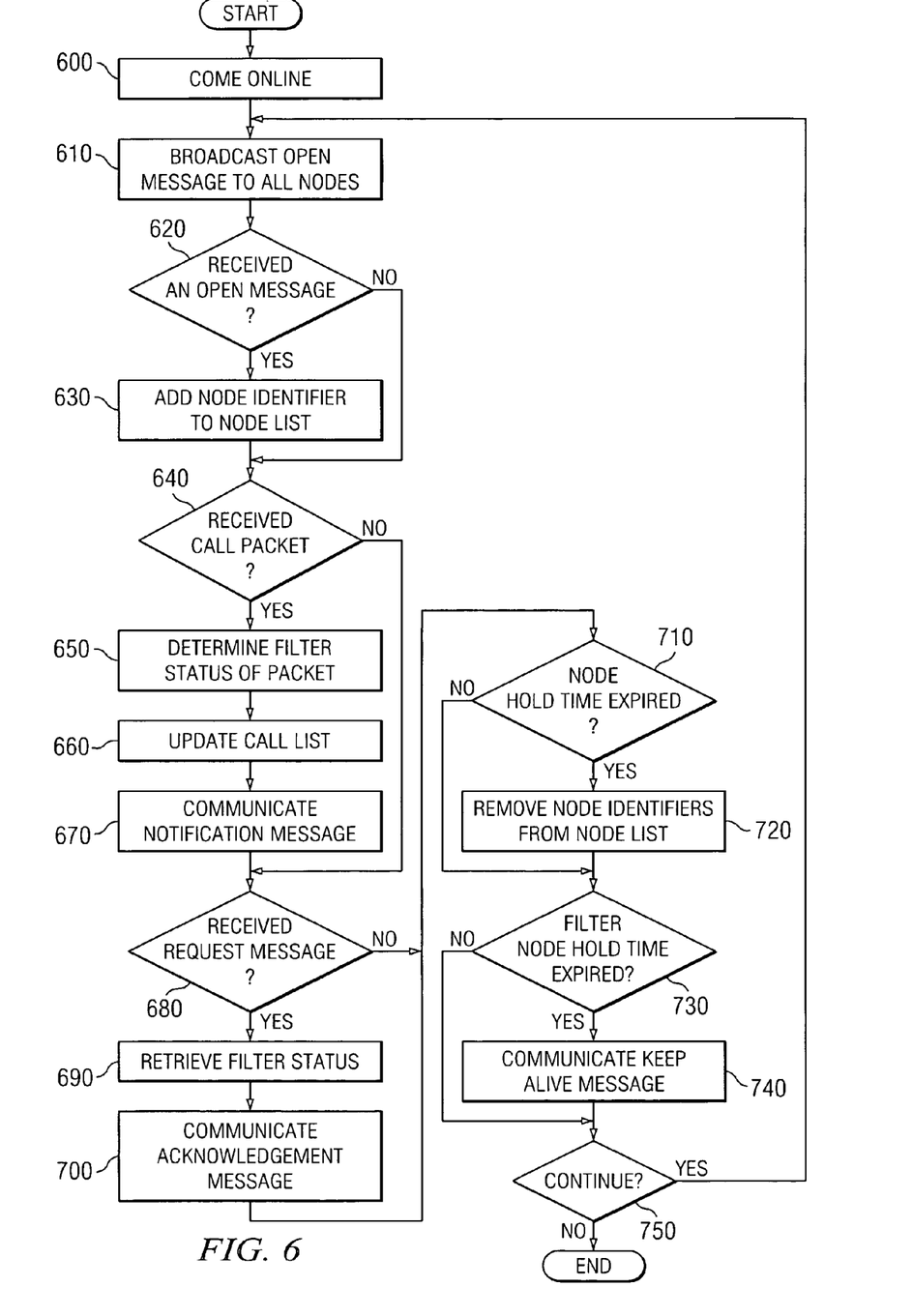
FIG. 6 is a flowchart illustrating operation of a filter node according to a particular embodiment.

FIG. 6 is a flow chart illustrating a method for communicating a filter status using a filter node 40. In the described embodiment, filter node 40 initially notifies nodes 30 of the capabilities of filter node 40 by sending an open message 500 similar to that described above in FIG. 5A.

At step 600, filter node 40 comes online in communication system 10, or otherwise becomes operable to communicate filter status information to other nodes 30 of communication system 10. Filter node 40 broadcasts open message 500 to all nodes 30 in communication system 10 at step 610. Open message 500 identifies hold time 504.

At step 620, filter node 40 determines whether filter node 40 has received open messages 500 or keepalive messages 540 from any node 30. If filter node 40 has received open message 500 or keepalive message 540 from a node 30, filter node 40 updates node list 200 maintained by filter node 40 at step 630. If filter node has received open message 500 from node 30, filter node 40 updates node list 200 by adding node identifier 210 and hold time 230 to node list 200. If filter node has received keepalive message 540 from node 30, filter node 40 updates the particular hold time 230 in node list 200 that is associated with node identifier 210 included in keepalive message 540.

At step 640, filter node 40 determines whether filter node 40 has received any call packets 50. If filter node 40 has received call packet 50, filter node 40 determines a filter status of call packet 50 at step 650. At step 660, filter node 40 updates call list 70 to include filter status information 512 for the call associated with call packet 50. At step 670, filter node 40 communicates a notification message 510 that indicates the filter status information 512 to all nodes 30 in node list 200.

At step 680, filter node 40 determines whether filter node 40 has received any request messages 520. If filter node 40 has received request message 520, filter node 40 accesses call list 70 to retrieve filter status information 512 for call identifier 60 included in request message 520 at step 690. At step 700, filter node 40 communicates acknowledgement message 530 to node 30 that sent request message 520.

At step 710, filter node 40 determines whether any hold times 504 associated with nodes 30 in node list 200 have expired. If any hold times 504 have expired filter node 40 removes nodes 30 associated with the expired hold times 504 from node list 200 at step 720.

At step 730, filter node 40 determines whether hold time 504 that filter node 40 included in the most recent open message 500 or keepalive message 540 filter node 40 communicated to nodes 30 has expired. If hold time 504 for filter node 40 has expired, filter node 40 communicates keepalive message 540 to nodes 30 in node list 200 at step 740.

At step 750, filter node 40 may then repeat portions of this process returning to step 610. Filter node 40 may continue this process indefinitely or until any appropriate time depending on the configuration and characteristics of communication system 10. Moreover, the ordering of the steps may be changed during subsequent iterations of the process.

Figure 7:
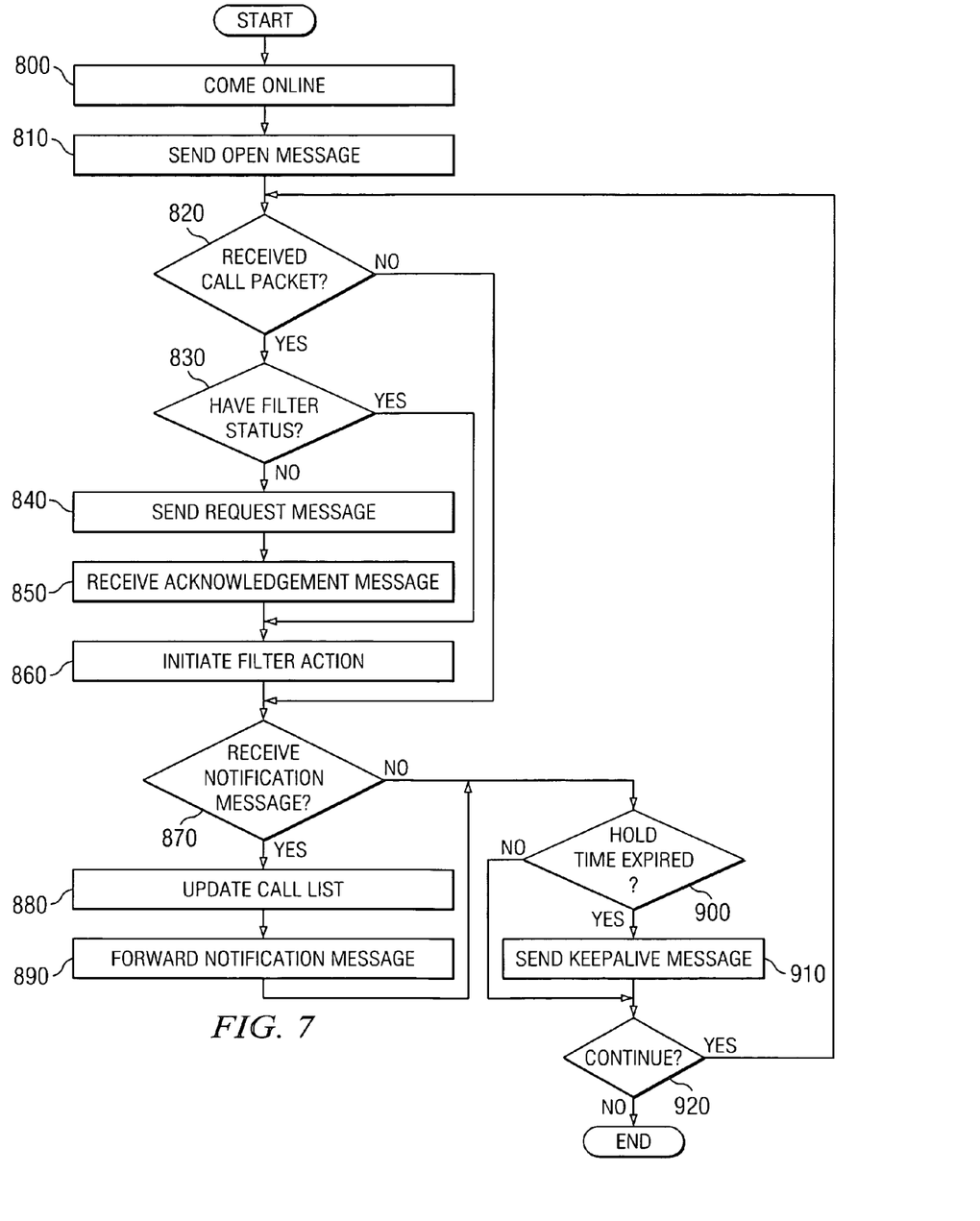
FIG. 7 is a flowchart illustrating operation of a node according to a particular embodiment.

FIG. 7 is a flow chart illustrating operation of node 30 after receipt of notification message 510. In the described embodiment, node 30 maintains a local copy of dynamic node information 55 and node list 200 and determines whether to forward notification message 510 based on dynamic node information 55 and node list 200.

At step 800, node 30 comes online in communication system 10, or otherwise becomes operable. Node 30 sends open message 500 to filter node 40 in communication system 10 at step 810. Open message 500 identifies hold time 504.

At step 820, node 30 determines whether node 30 has received any call packets 50. If node 30 has received call packet 50, node 30 determines whether call list 70 includes a filter status for the call associated with call packet 50 at step 830. If not, node 30 sends request message 520 requesting the filter status of the call to filter node 40 at step 840. At step 850, node 30 then receives acknowledgement message 540 which includes the filter status of the call. Node 30 may additionally update call list 70 to include the filter status. After determining the filter status of the call based on call list 70 and/or acknowledgement message 540, node 30 initiates appropriate filter actions for call packet 50.

At step 870, node 30 determines whether node 30 has received any notification messages 510. If node 30 has received notification message 510, node 30 updates call list 70 to include one or more filter statuses specified in notification message 510 at step 880. At step 890, node 30 then forwards notification message 510 to other appropriate nodes 30 based on dynamic node information 55 and configuration information 220 included in node list 200.

At step 900, node 30 determines whether hold time 504 that node 30 included in the most recent open message 500 or keepalive message 540 that node 30 communicated to filter node 40 has expired. If hold time 504 has expired, node 30 communicates keepalive message 540 to filter node 40 at step 910.

At step 920, node 30 may then repeat portions of this process returning to step 820. Node 30 may continue this process indefinitely or until any appropriate time depending on the configuration and characteristics of communication system 10. Moreover, the ordering of the steps may be changed during subsequent iterations of the process.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

For example, a particular embodiment of communication system 10 may represent a single component, such as a VoIP phone or gateway, that includes multiple modules. In such an embodiment, the various modules may determine a filter status of a call, communicate the filter status to one another, and decide whether to take filter actions as described herein. Furthermore, filter node 40 may represent a filtering module, such as Cisco, Inc.'s Generic Call Filter Module.

What is claimed is:

1. A method for tracking telecommunication services comprising:
    receiving at a filter node a call packet from a first node included in a plurality of nodes, wherein the call packet includes a call identifier identifying a call associated with the call packet;
    determining at the filter node a filter status of the call;
    registering the first node and a second node with the filter node in response to receiving an open message, the open message identifying a node operable to receive messages from the filter node, the registering the first node and the second node enabling the filter node to communicate one or more filter statuses to the registered first and second nodes;
    determining at the filter node, based on stored dynamic node information, to which of the plurality of the nodes to transmit one or more notification messages;
    transmitting, based on the determination, the one or more notification messages from the filter node to the first node from which the call packet was received and the second node, wherein the notification messages identify the call identifier and the filter status of the call and wherein the notification messages conform to a protocol that primarily communicates tracking information; and
    forwarding the call packet to the second node.

2. The method of claim 1, wherein the open message identifies a hold time for which the open message is valid.

3. The method of claim 1, further comprising receiving keepalive messages from the identified node, wherein the keepalive messages indicate that the identified node is still operable to receive notification messages, and wherein transmitting the notification message comprises transmitting the notification message to the identified node based on whether a keepalive message has been received within a predetermined time period.

4. The method of claim 3, wherein each keepalive messages identifies a hold time for which the keepalive message is valid.

5. The method of claim 1, wherein determining a filter status of the call comprises determining a filter status of the call based on at least one of a calling number associated with the call, a called number associated with the call, a network address associated with the call, and a carrier associated with the call.

6. The method of claim 1, further comprising determining a filter action associated with the call based, at least in part, on the filter status of the call.

7. The method of claim 6, wherein the filter action comprises selecting an alternate path to a destination node of the call.

8. The method of claim 6, wherein the filter action comprises delivering the call to a destination node and a third node.

9. The method of claim 1, wherein the open message further identifies one or more types of filter statuses that the network node is capable of receiving and one or more types of messages that the network node is capable of receiving.

10. A method for tracking telecommunication services comprising:
    receiving a request message at a first filter node from a first remote node included in a plurality of nodes, wherein the request message includes a call identifier;
    in response to receiving the request message, determining, at the first filter node whether the first filter node possesses a filter status associated with the call identifier;
    registering the first remote node with the filter node in response to receiving an open message, the open message identifying a node operable to receive messages from the first filter node, the registering the first node enabling the first filter node to communicate filter statuses to the registered first remote node;
    determining, at the first filter node, based on stored dynamic node information, to which of the plurality of the nodes to transmit one or more acknowledgement messages;
    in response to determining that the first filter node possesses a filter status associated with the call identifier:
        determining, at the first filter node, a filter status associated with the call identifier; and
        transmitting an acknowledgement message to the remote node from which the request message was received, wherein the acknowledgement message identifies the filter status and wherein the acknowledgement message conforms to a protocol that primarily communicates tracking information; and
    in response to determining that the first filter node does not possess a filter status associated with the call identifier, indicate to the remote node a second filter node that possesses a filter status associated with the call identifier.

11. The method of claim 10, wherein determining a filter status associated with the call identifier comprises determining a filter status of the call based on at least one of a calling number associated with the call, a called number associated with the call, a network address associated with the call, and a carrier associated with the call.

12. An apparatus for distributing tracking information comprising:
    a network interface operable to:
        receive a call packet from a first node included in a plurality of nodes, wherein the call packet includes a call identifier identifying a call associated with the call packet;

receive an open message, the open message identifying a node operable to receive one or more notification messages;

a memory operable to store a filter list, wherein the filter list identifies filter statuses associated with one or more call identifiers;

a processor operable to:
   determine a filter status of the call based on at least the filter list;
   register the first node and a second node with the filter node in response to receiving the open message, the registering the first node and the second node enabling the filter node to communicate one or more filter statuses to the registered first and second nodes; and
   determine, based on stored dynamic node information, to which of the plurality of the nodes to transmit one or more notification messages;

wherein the network interface is further operable to:
   transmit, based on the determination, the one or more notification messages to the first node from which the call packet was received and the second node wherein the notification messages identify the call identifier and the filter status of the call and wherein the notification messages conform to a protocol that primarily communicates tracking information; and
   forward the call packet to the second node.

13. The apparatus of claim 12, wherein the open message identifies a hold time for which the open message is valid.

14. The apparatus of claim 12, wherein the network interface is further operable to receive keepalive messages from the identified node, wherein the keepalive messages indicate that the identified node is still operable to receive notification messages, and wherein the network interface is further operable to transmit the notification message to the identified node based on whether a keepalive message has been received from the identified node within a predetermined time period.

15. The apparatus of claim 14, wherein the keepalive message identifies a hold time for which the keepalive message is valid.

16. The apparatus of claim 12, wherein the processor is further operable to determine the filter status of the call based on the filter list and at least one of a calling number associated with the call, a called number associated with the call, a network address associated with the call, and a carrier associated with the call.

17. The apparatus of claim 12, wherein the processor is further operable to determine a filter action associated with the call based, at least in part, on the filter status of the call.

18. The apparatus of claim 17, wherein the filter action comprises selecting an alternate path to a destination node of the call.

19. The apparatus of claim 17, wherein the filter action comprises delivering the call to a destination node and a third node.

20. The apparatus of claim 12, wherein the open message further identifies one or more types of filter statuses that the network node is capable of receiving and one or more types of messages that the network node is capable of receiving.

21. An apparatus for distributing tracking information comprising:
   a network interface operable to receive a request message from a first remote node included in a plurality of nodes, wherein the request message includes a call identifier;
   a memory operable to store a filter list, wherein the filter list identifies filter statuses associated with one or more call identifiers;
   a processor operable to:
      determine whether the filter list identifies a filter status associated with the call identifier included in the request message;
      registering the first remote node with the filter node in response to receiving an open message, the open message identifying a node operable to receive messages from the first filter node, the registering the first node enabling the first filter node to communicate filter statuses to the registered first remote node; and
      determining, at the first filter node, based on stored dynamic node information, to which of the plurality of the nodes to transmit one or more acknowledgement messages;
   wherein the network interface is further operable to:
      in response to the processor determining that the filter list identifies a filter status associated with the call identifier included in the request message, transmit an acknowledgement message to the remote node from which the request message was received, wherein the acknowledgement message identifies the filter status associated with the call identifier and wherein the acknowledgement message conforms to a protocol that primarily communicates tracking information; and
      in response to the processor determining that the filter list does not identify a filter status associated with the call identifier included in the request message, indicate to the remote node a filter node that possesses a filter status associated with the call identifier included in the request message.

22. The apparatus of claim 21, wherein the processor is further operable to determine the filter status associated with the call identifier based on the filter list and at least an incoming calling number associated with the call, a telephone number associated with the call, a network address associated with the call, and a carrier associated with the call.

23. A system for tracking telecommunication services comprising:
   a plurality of network nodes;
   a filter node operable to:
      receive a call packet from a first network node included in the plurality of network nodes, wherein the call packet includes a call identifier identifying a call associated with the call packet;
      determine a filter status of the call;
      register the first network node and a second network node with the filter node in response to receiving an open message, the open message identifying a node operable to receive messages from the filter node, the registering the first node and the second node enabling the filter node to communicate one or more filter statuses to the registered first and second nodes;
      determine, based on stored dynamic node information, to which of the plurality of the nodes to transmit one or more notification messages;
      transmit notification messages to a the first network node from which the call packet was received and the second network node, wherein the notification messages identify the call identifier and the filter status of the call and wherein the notification messages conform to a protocol that primarily communicates tracking information; and
      forward the call packet to the second network node; and
   wherein each of the plurality of network nodes is operable to receive the call packet and to take a filter action based on the filter status of the call.

24. The system of claim 23, wherein the open message identifies a hold time for which the open message is valid.

25. The system of claim 23, wherein one or more network nodes are further operable to transmit keepalive messages to the filter node, wherein the keepalive messages indicate that the network node sending the keepalive message is still operable to receive notification messages, and wherein the filter node is further operable to transmit the notification message to only network nodes from which the filter node has received a keepalive message within a predetermined time period.

26. The system of claim 25, wherein the keepalive message identifies a hold time for which the keepalive message is valid.

27. The system of claim 23, wherein the filter node is further operable to determine the filter status of the call by determining the filter status of the call based on at least a calling number associated with the call, a called number associated with the call, a network address associated with the call, and a carrier associated with the call.

28. The system of claim 23, wherein the filter node comprises one of a plurality of filter nodes.

29. The system of claim 23, wherein the filter node is further operable to determine a filter action associated with the call based, at least in part, on the filter status of the call.

30. The system of claim 29, wherein the filter action comprises selecting an alternate path to a destination node of the call.

31. The system of claim 29, wherein the filter action comprises delivering the call to a destination node and a monitoring node.

32. The system of claim 23, wherein the open message further identifies one or more types of filter statuses that the network node sending the open message is capable of receiving and one or more types of messages that the network node sending the open message is capable of receiving.

33. A system for tracking telecommunication services comprising:
a first network node included in a plurality of network nodes, the first network node operable to transmit a request message wherein the request message includes a call identifier;
a first filter node operable to:
receive the request message;
in response to receiving the request message, determine whether the first filter node possesses a filter status associated with the call identifier;
register the first network node with the filter node in response to receiving an open message, the open message identifying a node operable to receive messages from the first filter node, the registering the first node enabling the first filter node to communicate filter statuses to the registered first remote node;
determine, based on stored dynamic node information, to which of the plurality of the nodes to transmit one or more acknowledgement messages;
in response to determining that the first filter node possesses a filter status associated with the call identifier:
determine a filter status associated with the call identifier; and
transmit an acknowledgement message to the network node from which the request message was received, wherein the acknowledgement message includes filter status information associated with the call identifier and wherein the acknowledgement message conforms to a protocol that primarily communicates tracking information; and
in response to determining that the first filter node does not possess a filter status associated with the call identifier, indicate to the remote node a second filter node that possesses a filter status associated with the call identifier.

34. The system of claim 33, wherein the filter node is further operable to determine the filter status associated with the call identifier based on at least one of a calling number associated with the call, a telephone number associated with the call, a network address associated with the call, and a carrier associated with the call.

35. The system of claim 33, wherein the filter node comprises one of a plurality of filter nodes.

36. A system for tracking telecommunication services comprising:
means for receiving at a filter node a call packet from a first node included in a plurality of nodes, wherein the call packet includes a call identifier identifying a call associated with the call packet;
means for determining at the filter node a filter status of the call;
means for registering the first node and a second node with the filter node in response to receiving an open message, the open message identifying a node operable to receive messages from the filter node, the registering the first node and the second node enabling the filter node to communicate one or more filter statuses to the registered first and second nodes;
means for determining at the filter node, based on stored dynamic node information, to which of the plurality of the nodes to transmit one or more notification messages;
means for transmitting, based on the determination, the one or more notification messages from the filter node to the first node from which the call packet was received and the second node, wherein the notification messages identify the call identifier and the filter status of the call and wherein the notification messages conform to a protocol that primarily communicates tracking information; and
means for forwarding the call packet to the second node.

37. A system for tracking telecommunication services comprising:
means for receiving a request message at a first filter node from a first remote node included in a plurality of nodes, wherein the request message includes a call identifier;
means for determining, at the first filter node whether the first filter node possesses a filter status associated with the call identifier in response to receiving the request message;
registering the first remote node with the filter node in response to receiving an open message, the open message identifying a node operable to receive messages from the first filter node, the registering the first node enabling the first filter node to communicate filter statuses to the registered first remote node;
determining, at the first filter node, based on stored dynamic node information, to which of the plurality of the nodes to transmit one or more acknowledgement messages;
means for, in response to determining that the first filter node possesses a filter status associated with the call identifier:
determining, at the first filter node a filter status associated with the call identifier; and
transmitting an acknowledgement message to the remote node from which the request message was received, wherein the acknowledgement message identifies the filter status and wherein the acknowledgement message conforms to a protocol that primarily communicates tracking information; and means for indicating to the remote node a second filter node that possesses a filter status associated with the call identifier in response to determining that the first filter node does not possess a filter status associated with the call identifier.

* * * * *